United States Patent [19]

Karakama et al.

[11] Patent Number: 5,136,930
[45] Date of Patent: Aug. 11, 1992

[54] APPARATUS FOR SUPPLYING PRESSURE OIL TO HYDRAULIC CYLINDERS EMPLOYED IN WORKING MACHINES

[75] Inventors: Tadao Karakama; Hiroshi Endo; Sadao Nunotani; Naoki Ishizaki; Toshiro Takano, all of Kanagawa, Japan

[73] Assignee: Kabushiki Kaisha Komatsu Seisakusho, Japan

[21] Appl. No.: 474,042
[22] PCT Filed: Aug. 30, 1989
[86] PCT No.: PCT/JP89/00891
§ 371 Date: Jun. 20, 1990
§ 102(e) Date: Jun. 20, 1990
[87] PCT Pub. No.: WO90/02267
PCT Pub. Date: Mar. 8, 1990

[30] Foreign Application Priority Data

Aug. 31, 1989 [JP] Japan .................. 63-215180

[51] Int. Cl.⁵ .............................................. F15B 11/08
[52] U.S. Cl. ................................... 91/454; 91/459; 91/461; 137/596.15; 137/596.16; 251/30.02
[58] Field of Search ............... 91/420, 454, 461, 459; 137/596.14, 596.15, 596.16; 251/30.02

[56] References Cited

U.S. PATENT DOCUMENTS

| | | | |
|---|---|---|---|
| 3,010,479 | 11/1961 | Foley | 91/454 X |
| 3,838,710 | 10/1974 | Reip | 91/454 |
| 3,906,991 | 9/1975 | Hanssler | 91/420 X |
| 4,188,976 | 2/1980 | Austin, Jr. | 137/596.14 X |
| 4,353,289 | 10/1982 | Lonnemo | 91/420 |
| 4,479,678 | 10/1984 | Sharp | 91/454 |
| 4,531,449 | 7/1985 | Reith | 91/420 |
| 4,646,622 | 3/1987 | Ishizaki et al. | 91/454 X |
| 4,750,704 | 6/1988 | Brundage | 251/30.02 |
| 4,753,157 | 6/1988 | Lonnemo et al. | 91/454 X |
| 4,811,650 | 3/1989 | Linnemo | 91/454 X |

FOREIGN PATENT DOCUMENTS

| | | | |
|---|---|---|---|
| 2343183 | 9/1977 | France | 91/420 |
| 0119558 | 4/1977 | Japan | 91/420 |
| 52-142169 | 11/1977 | Japan . | |
| 54-33972 | 3/1979 | Japan . | |
| 55-149402 | 11/1980 | Japan . | |
| 0121304 | 7/1983 | Japan | 91/420 |
| 0113378 | 6/1984 | Japan | 91/420 |
| 0113379 | 6/1984 | Japan | 91/420 |
| 0561814 | 7/1977 | U.S.S.R. | 91/420 |

Primary Examiner—Edward K. Look
Assistant Examiner—Todd Mattingly
Attorney, Agent, or Firm—Ronald P. Kananen

[57] ABSTRACT

An apparatus for supplying a pressure oil to a plurality of hydraulic cylinders of a working machine such as power shovels provided with working equipment such as shovels, wherein the cylinders are contracted at the same speed to move down or lower the working equipments at the same speed, so that the working equipment are prevented from suddenly dropping off in operation even if pressure oil passages (a, b) supplying the pressure oil to the cylinders are damaged during operation. The apparatus comprises: a lock valve assembly (B) provided with a valve housing (70) mounted on a cylinder tube of each of the hydraulic cylinders, in which valve housing (70) a check valve (77), a poppet valve (78) and a pilot valve (79) are mounted; and a directional control valve assembly (C) for selectively supplying the pressure oil to a lifting-movement pressure chamber (9a) and a lowering-movement pressure chamber (9b) of each of the hydraulic cylinders through the pressure oil passages (a, b), respectively.

1 Claim, 7 Drawing Sheets

FIG. 8
THE PRIOR ART

FIG. 9
THE PRIOR ART

APPARATUS FOR SUPPLYING PRESSURE OIL TO HYDRAULIC CYLINDERS EMPLOYED IN WORKING MACHINES

FIELD OF THE INVENTION

The present invention relates to an apparatus for supplying a pressure oil to hydraulic cylinders employed in working machines or construction machines such as arm-type power shovels and the like provided with a working equipment which is moved up and down by the cylinders.

DESCRIPTION OF THE PRIOR ART

In conventional apparatus for supplying a pressure oil to a lifting-movement pressure chamber or a lowering-movement pressure chamber of a hydraulic cylinder employed in a working machine such as power shovels and the like, the pressure oil is discharged from a hydraulic pump and supplied to a control valve in which the pressure oil is selectively supplied to a first and a second outlet port of the control valve, the first and the second outlet port being connected to the lifting-movement and the lowering movement pressure chamber of the hydraulic cylinder through pressure oil passages, respectively.

Since the conventional apparatus for supplying the pressure oil to the hydraulic cylinder has the above construction, there is a fear that the working equipment such as shovels and the like having been lifted by the cylinder suddenly drops off when the pressure oil passages connected to the lifting-movement pressure chamber of the cylinder is damaged in operation, because the pressure oil confined within the lifting-movement pressure chamber of the cylinder suddenly flows out of the chamber through the damaged passages to permit a piston rod of the hydraulic cylinder to be suddenly retracted.

Figure 8:
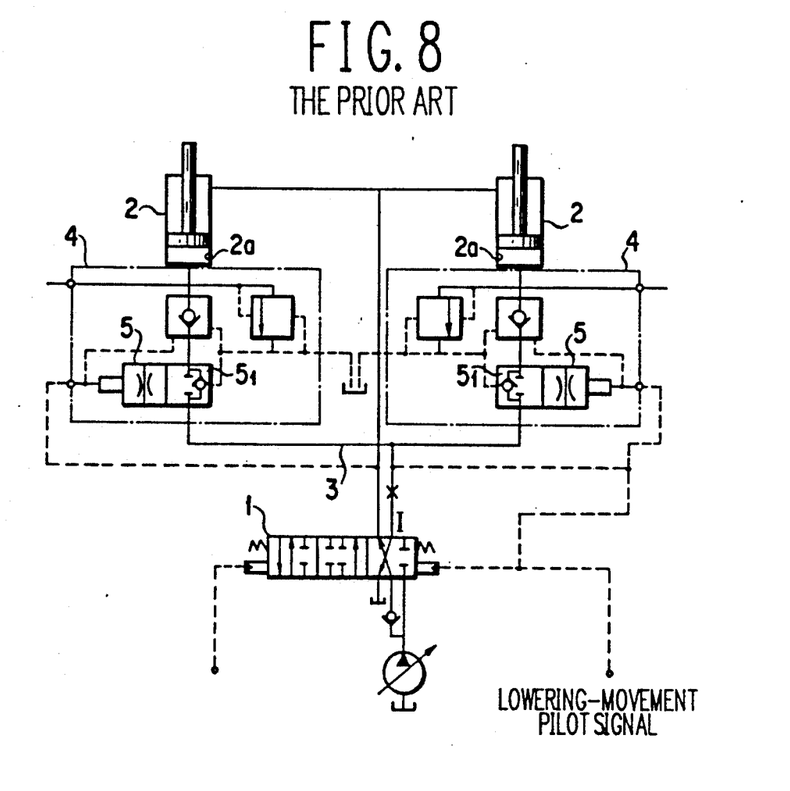
FIG. 8 is a hydraulic circuit of the conventional apparatus employing the sudden-drop prevention valve assembly.

Hitherto, in this connection, it is known to prevent, in a manner realized with a conventional construction shown in FIG. 8, the working equipment such as shovels and the like employed in the working machine such as power shovels and the like from suddenly dropping off.

In the conventional construction shown in FIG. 8, a directional control valve 1 is connected with a lifting-movement pressure chamber 2a of a hydraulic cylinder 2 employed in the working machine such as power shovel and the like through pressure all passgage 3 connected to a sudden-drop prevention valve assembly 4. In the valve assembly 4, a flow control valve 5 thereof is kept in its first position 5₁ in which: a pressure oil flow is prevented from being issued from the lifting-movement pressure chamber 2a of the cylinder 2 to the directional control valve 1, and another pressure oil flow issued to the lifting-movement pressure chamber 2a of the cylinder 2 is permitted, so that the pressure oil having been confined within the lifting-movement pressure chamber 2a of the cylinder 2 is prevented from flowing out of the chamber 2a even if the pressure oil passages 3 through which the sudden-drop prevention valve assembly 4 is connected with the directional control valve 1 are damaged in operation.

On the other hand, it is required to move down or lower the working equipment in operation, a signal through which the directional control valve 1 is so operated as to be positioned in a move-down or lowering position 1 is also issued to the flow control valve 5 of the sudden-drop prevention valve assembly 4 so that an amount of the pressure oil flowing out of the lifting-movement pressure chamber 2a of the cylinder 2 is controlled so as to correspond to an opening amount of the directional control valve 1, the pressure oil flowing out of the lifting-movement pressure chamber 2a of the cylinder 2 being received in a drain tank, whereby the working equipment such as shovels and the like is moved down or lowered in safety manner in operation without any fear that the equipment suddenly drops off even if the pressure oil passages 3 connected with the lifting-movement pressure chamber 2a of the cylinder 2 are damaged in operation.

Figure 9:
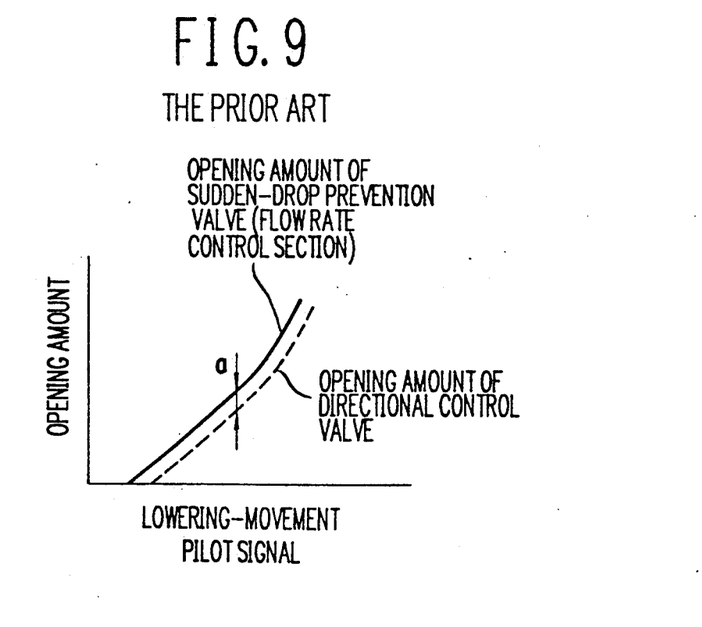
FIG. 9 is a (move-down or lowering-movement pilot signal to opening amount) graph indicating the operational characteristic of the sudden-drop prevention valve assembly of the conventional apparatus.

In the above conventional construction, since the directional control valve 1 is synchronized in opening amount with the flow control valve 5 of the sudden-drop prevention valve assembly 4, it is required that the directional control valve 1 is larger in opening amount then the flow control valve 5 of the valve assembly 4 by an amount of alpha as shown in FIG. 9 so as to ensure a sure flow controllability of the directional control valve 1 during move-down or lowering operation of the working equipment and so as to ensure a safety speed control of the cylinder 2 after the the pressure oil passages 3 connected to the cylinder 2 are damaged.

Consequently, the conventional apparatus surface from the following problems inherent in the above construction:

(1) it is necessary that an opening area of the flow control valve 5 of the sudden-drop prevention valve assembly 4 is controlled so as to be synchronized with an opening area of the directional control valve 1 even when the opening area of the directional control valve 1 varies;

(2) when the working equipment is moved down or lowered in operation, the pressure oil having been confined within the lifting-movement pressure chamber 2a of the cylinder 2 is restricted in both of the flow control valve 5 of the sudden-drop prevention valve assembly 4 and the directional control valve 1 to increase its pressure loss, so that a maximum move-down or lowering speed of the working equipment driven by the cylinder 2 is impaired; and (3) when the pressure oil passages 3 are damaged at a position marked with an "A" during lowering operation of the working equipment, the pressure oil confined within the lifting-movement pressure chamber 2a of the cylinder 2 flows out of the chamber 2a only through the flow control valve 5 of the sudden-drop prevention valve assembly 4. Consequently, in this case, since the working equipment is lowered at a speed larger than that realized with the pressure oil flowing out of the chamber 2a through both of the flow control valve 5 and the directional control valve 1, there is a fear that the working equipment such as shovels and the like hits its obstacles, for example such as articles and humans on the ground.

Furthermore, since the conventional apparatus for preventing the working equipment from suddenly dropping off requires the flow control valve 5 in addition to the directional control valve 1, the conventional apparatus is costly.

SUMMARY OF THE INVENTION

In view of such circumstances described above, the present invention was made. Consequently, it is an object of the present invention to provide an apparatus for supplying a pressure oil to hydraulic cylinders employed in working machines or construction machines such as arm-type power shovels and the like provided with working equipment such as shovels and the like which are moved up and down by the cylinders while prevented from suddenly dropping off even if pressure oil passages for supplying the pressure oil to the cylinders are damaged in operation.

It is another object of the present invention to provide an apparatus for supplying a pressure oil to hydraulic cylinders employed in working machines provided with working equipments which are moved up and down by the cylinders, in which apparatus: by controlling without regard for condition of a directional control valve an amount of pressure oil flowing out of a lifting-movement pressure chamber of the cylinder to a tank port of a lock valve, it is not required for a flow control valve to have its opening area controlled according to variation of an opening area of the directional control valve.

It is further another object of the present invention to provide an apparatus for supplying a pressure oil to hydraulic cylinders employed in working machines provided with working equipments which are moved up and down by the cylinders, in which apparatus: the hydraulic cylinders are synchronized with each other in move-down or lowering operation of the working equipments so as to lower the equipments at the same lowering speed even if pressure oil passages for supplying the pressure oil to the cylinders are damaged in normal working operation of the working machines.

According to a preferred embodiment of the present invention, the above objects of the present invention are accomplished by providing:

An apparatus for supplying a pressure oil to a hydraulic cylinder of a working machine provided with a working equipment, comprising:

a directional control valve assembly capable of being thrown into: a first position in which the pressure oil is supplied to a first port formed in one side of a valve housing, and a second port formed in another side of the valve housing communicates with a first tank port; and a second position in which the pressure oil is supplied to the second port, and the pressure oil to the first port is fully cut off; and a lock valve assembly comprising: a check valve for preventing the pressure oil from flowing out of a first main port to a second main port, the first main port being formed in a portion of another valve housing mounted on a cylinder tube of the hydraulic cylinder so as to communicate with a lifting-movement pressure chamber of the hydraulic cylinder, and the second main port being formed in another portion of the another valve housing; a poppet valve provided in a valve bore formed in a position between a first main port and a second tank port formed in further another portion of the another valve housing, the poppet valve being provided with a poppet which selectively prevents the first main port from communicating with the second tank port, and permits the first main port to communicate with the second tank port when a differential pressure of the pressure oil is developed between a front side and rear side of a throttle area of the poppet valve; and a pilot valve which is provided in the another valve housing to open and close its pressure oil passages so as to selectively permit the pressure oil to flow from a downstream side of the throttle area of the poppet valve to the second tank port through a variable throttle area of the pilot valve, which variable throttle area is controlled by an external signal;

wherein: the first port of the directional control valve assembly is communicated with the lifting-movement pressure chamber of the hydraulic cylinder sequentially through a pressure oil passage, the second main port of the lock valve assembly and the first main port of the lock valve assembly; and the second port of the directional control valve assembly is communicated with a lowering-movement pressure chamber of the hydraulic cylinder through a pressure oil passage.

In the apparatus of the present invention, it is possible for the check valve of the lock valve assembly to prevent the pressure oil confined within the lifting-movement pressure chamber of the hydraulic cylinder from flowing to the pressure oil passage, and further a flow of the pressure oil toward the tank port is prevented by the poppet valve. Consequently, in the apparatus of the present invention, there is no fear that the pressure oil confined within the lifting-movement pressure chamber of the hydraulic cylinder flows out of the chamber even if the pressure oil passages are damaged in operation, which eliminates a fear that the hydraulic cylinder suddenly contracts in the above damage to cause the working equipment such as shovels and the like to suddenly drop off in operation.

In addition, in the apparatus of the present invention, it is possible to control an amount of the pressure oil flowing from an inlet port of the poppet valve to an outlet port thereof by controlling an opening amount of the variable throttle area of the pilot valve of the lock valve assembly to control an amount of the pressure oil flowing toward the tank port in an area located downstream of the variable throttle area of the pilot valve. Futhermore, at this time, in the apparatus of the present invention, the pressuer oil confined within the lifting-movement pressure chamber flows directly to a drain tank via the tank port through the lock valve assembly. Consequently, in the apparatus of the present invention, it is possible to control the amount of the pressure oil flowing from out of the lifting-movement pressure chamber of the hydraulic cylinder to the tank port without regard for condition of the directional control valve, so that, in contrast with the conventional apparatus, it is not required to control an amount of the opening area of the flow control valve of the sudden-drop prevention valve assembly so as to be synchronized with an opening area of the directional control valve even when the opening area of the directional control valve varies.

In addition, in the apparatus of the present invention, it is possible to move down or lower a plurality of the hydraulic cylinders at the same speed even if the pressure oil passages for supplying the pressure oil to these cylinder damaged in operation.

Further, since the directional control valve assembly of the apparatus of the present invention does not function to control an amount of the pressure oil flowing to the drain tank in lowering operation of the working equipment, the directional control valve assembly is not costly.

The above objects, additional objects, additional embodiments and advantages of the present invention will be clarified to those skilled in the art hereinbelow with reference to the following description and accompanying drawings illustrating preferred embodiments of the present invention according to principles of the present invention.

BRIEF DESCRIPTION OF THE DRAWINGS

FIGS. 1 to 7 are the drawings relating to an embodiment of the apparatus of the present invention, in which:

FIG. 1 (b) is a partially sectional view of a directional control valve assembly employed in the apparatus of the present invention;

DESCRIPTION OF THE PREFERRED EMBODIMENTS

Hereinbelow, an embodiment of the present invention will be described in detail with reference to the accompanying drawings.

Figure 1A:
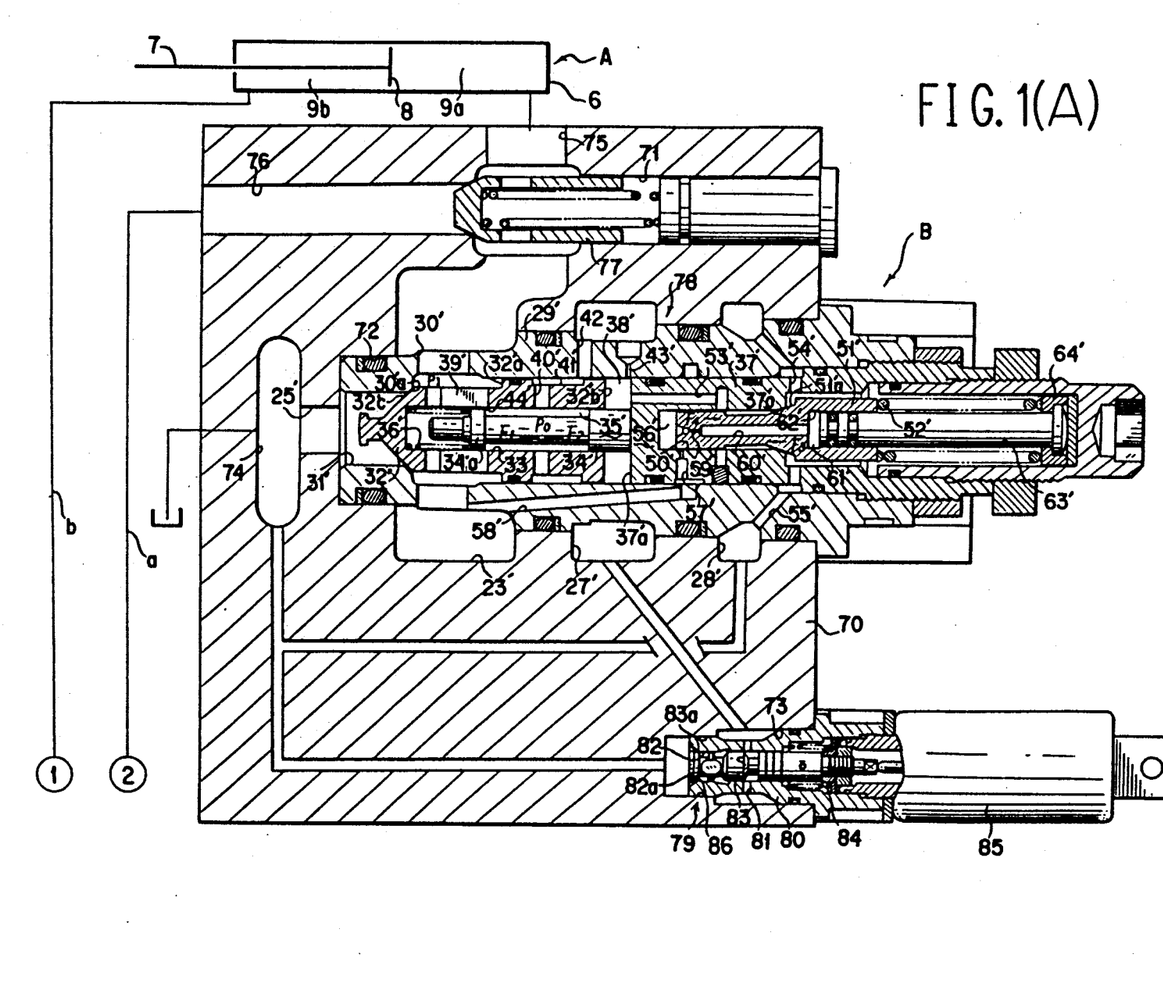
FIG. 1(a) is a partially sectional view of a lock valve assembly employed in the apparatus of the present invention.

In FIGS. 1(a), a hydraulic cylinder "A" employed in a working machine such as power shovels and the like operates working equipment such as shovels and the like (not shown) to move the same up and down. The cylinder "A" comprises a cylinder tube 6 in which a piston 8 provided with a piston rod 7 is slidably mounted to define a move-up or lifting-movement pressure chamber 9a and a move-down or lowering-movement pressure chamber 9b in the cylinder tube 6. Both a lock valve assembly "B" and a directional control valve assembly "C" are mounted on the cylinder tube 6 of the hydraulic cylinder "A".

Figure 2:
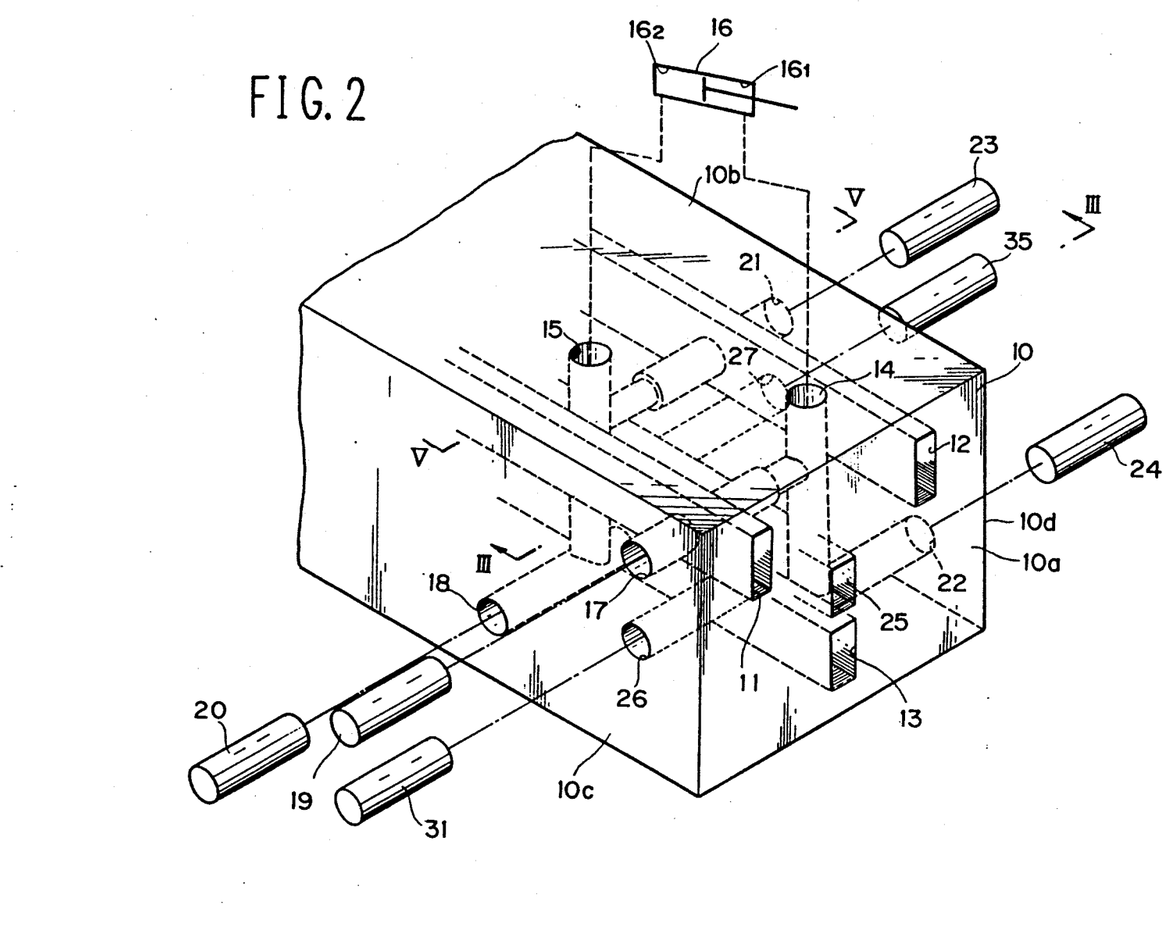
FIG. 2 is a perspective view of a valve housing of the directional control valve assembly of the apparatus of the present invention.

As shown in FIG. 2, the directional control valve assembly "C" is provided with a valve housing 10 which has a predetermined lateral width, a predetermined longitiduinal width and a predetermined height to assume a substantially rectangular parallelepiped form.

In an upper portion of the valve housing 10 of the directional control valve assembly "C" are formed a first pump port passage 11 and a second pump port passage 12 which communicate with a hydraulic pump (not shown), are parallel to each other and horizontally extend in the lateral width direction of the valve housing 10 to open into an end surface 10a of the valve housing 10, which end surface 10a is perpendicular to the lateral width direction of the valve housing 10. In addition, a tank port passage 13 is so formed in the valve housing 10 as to be disposed in a lower portion of the valve housing 10, as to be disposed in a central position of the longitudinal width of the valve housing 10, as to horizontally extend in the lateral width direction of the valve housing 10 and as to communicate with a drain tank (not shown) to open into the end surface 10a of the valve housing 10.

Further, a first port passage 14 and a second port passage 15 are so formed in the valve housing 10 as not to be aligned with each other in both of the lateral width direction and the longitudinal width direction of the valve housing 10, as to extend vertically to open into an upper surface 10b of the valve housing 10 and as to communicate with a first pressure chamber $16_1$ and a second pressure chamber $16_2$ of a hydraulic equipment 16, respectively. The first pressure chamber $16_1$ and the second pressure chamber $16_2$ of the hydraulic equipment 16 correspond to the lifting-movement pressure chamber 9a and the lowering-movement pressure chamber 9b of the hydraulic cylinder "A". Namely, the lifting-movement pressure chamber 9a and the lowering-movement pressure chamber 9b of the hydraulic cylinder "A" communicate with the first port passage 14 and the second port passage 15 through pressure oil passages "a" and b, respectively. In addition, the first port passage 14 and the second port passage 15 are so formed in the valve housing 10 as not to interfere with any of the first pump port passage 11, second pump port passage 12 and the tank port passage 13.

Further, as shown in FIG. 2, in the valve housing 10, a first meter-in valve receiving bore 17 and a first meter-out valve receiving bore 18 are so formed as to open into a side surface 10c of the valve housing 10 perpendicular to the longitudinal width direction of the valve housing 10, as not to be aligned with each other in the height direction and lateral width direction of the valve housing 10, as to horizontally extend in the longitudinal width direction of the valve housing 10. The first meter-in valve receiving bore 17 is so disposed in the upper portion of the valve housing 10 as to penetrate the first pump port passage 11, as to communicate with the first port passage 14 and as to receive a first meter-in valve 19 therein to selectively shut off the first pump port passage 11 from the first port passage 14. On the other hand, the first meter-out valve receiving bore 18 is so disposed in the lower portion of the valve housing 10 as to open into the tank port passage 13m, as to communicate with the second port passage 15 and as to receive a first meter-out valve 20 therein to selectively shut off the tank port passage from the second port passage 15.

Furthermore, in the valve housing 10, a second meter-in valve receiving bore 21 and a second meter-out valve receiving bore 22 are so formed as to open into the other side surface 10d of the valve housing 10 perpendicular to the longitudinal width direction of the valve housing 10, as not to be aligned with each other in the height direction and the lateral width direction of the valve housing 10, as to horizontally extend in the longitudinal width direction of the valve housing 10. The second meter-in valve receiving bore 21 is so disposed in the upper portion of the valve housing 10 as to be aligned with the first meter-out valve receiving bore 18 in the lateral width direction of the valve housing 10, as to penetrate the second pump port passage 12, as to communicate with the second port passage 15 and as to receive a second meter-in valve 23 therein to selectively shut off the second pump port passage 12 from the second port passage 15. On the other hand, the second meter-out valve receiving bore 22 is so disposed in the lower portion of the valve housing 10 as to be aligned with the first meter-in valve receiving bore 17 in the lateral width direction of the valve housing 10, as to open into the tank port passage 13, as to communicate with the first port passage 14 and as to receive a second meter-out valve 24 therein to selectively shut off the tank port passage 13 from the first port passage 14.

Furthermore, as shown in FIG. 2, in central positions of both of the height and the longitudinal width of the valve housing 10 is disposed a pilot tank port passage 25 which extends horizontally in the lateral width direction of the valve housing 10 to open into the end surface 10a of the valve housing 10. Namely, the pilot tank port passage 25 is disposed in a position above the tank port passage 13 and extends parallel thereto.

In the valve housing 10 is further formed a first pilot valve receiving bore 26 which is so arranged: as to be disposed in a position under the first meter-in valve receiving bore 17; as to be similar to the pilot tank port passage 25 in height and to open into a side surface 10c of the valve housing 10, the side surface 10c being perpendicular to the longitudinal width direction of the valve housing 10; as to horizontally extend in the longitudinal width direction of the valve housing 10; and as not be aligned with both of the first pilot valve receiving bore 26 and the second port passage 15 in the lateral width direction of the valve housing 10.

In addition, a second pilot valve receiving bore 27 is so formed in the valve housing 10: as to be disposed in a lower portion of the valve housing 10; as to be similar to the pilot tank port passage 25 in height; as to open into the other side surface 10d of the valve housing 10; as to horizontally extend in the longitudinal width direction of the valve housing 10; and as not to be aligned with both of the second pilot valve receiving bore 27 and the first port passage 14 in the lateral width direction of the valve housing 10.

Figure 3:
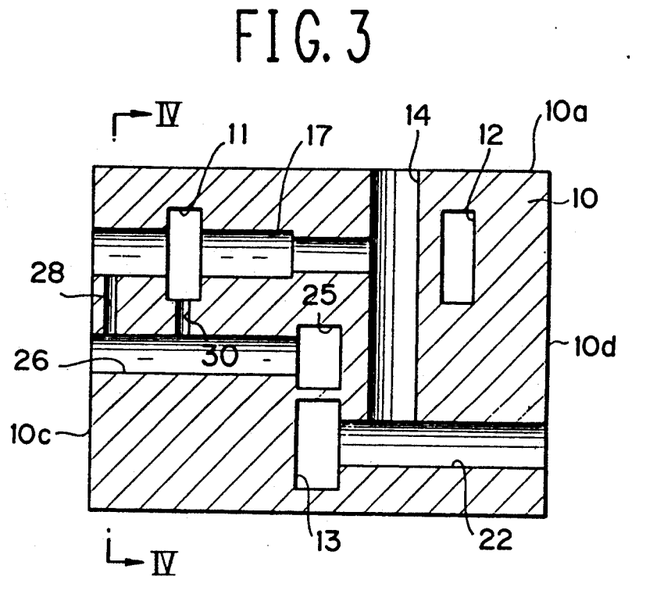
FIG. 3 is a cross-sectional view of the valve housing of the directional control valve assembly of the apparatus of the present invention, taken along the line 111—111 of FIG. 2.
Figure 4:
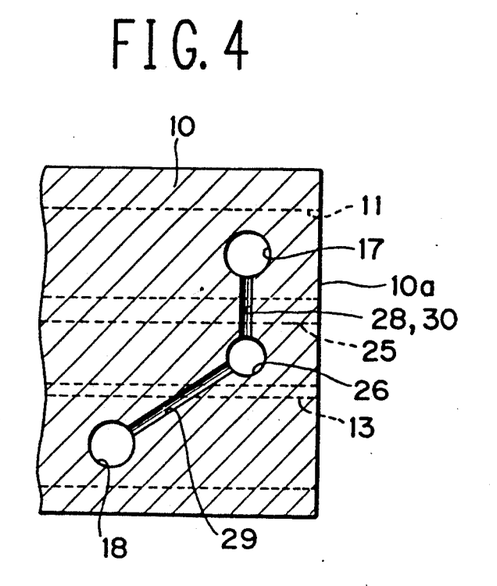
FIG. 4 is a cross-sectional view of the valve housing of the directional control valve assembly of the apparatus of the present invention, taken along the line 1V—1V of FIG. 3.
Figure 5:
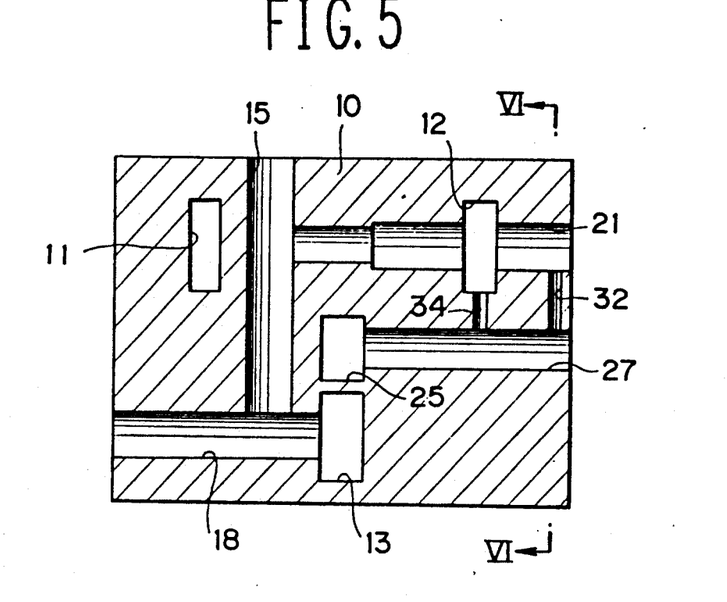
FIG. 5 is a cross-sectional view of the valve housing of the directional control valve assembly of the apparatus of the present invention, taken along the line V—V of FIG. 2.
Figure 6:
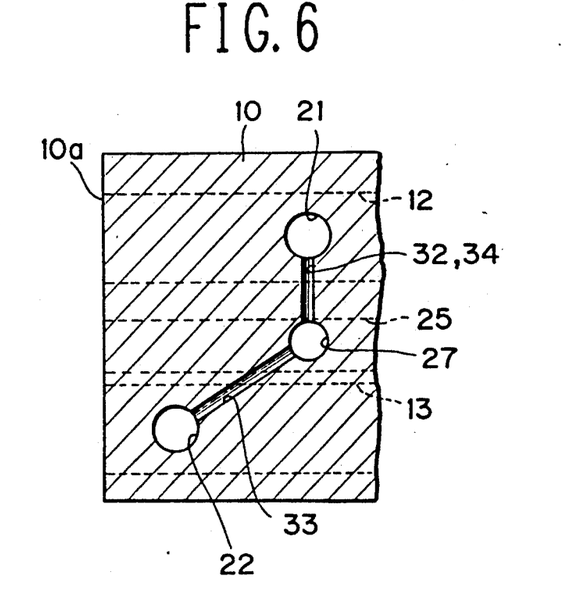
FIG. 6 is a cross-sectional view of the valve housing of the directional control valve assembly of the apparatus of the present invention, taken along the line V1—V1 of FIG. 5.

As shown in FIGS. 3 and 4, the first pilot valve receiving bore 26 communicates with the pilot tank port passage 25 and further communicates with the first meter-in valve receiving bore 17, first meter-out valve receiving bore 18 and the first pump port passage 11 through a first oil hole 28, a second oil hole 29 and a third oil hole 30. A first pilot valve 31 is inserted into the first pilot valve receiving bore 26 of the valve housing 10 as shown in FIG. 2. On the other hand, as shown in FIGS. 5 and 6, the second pilot valve receiving bore 27 communicates with the pilot tank port passage 25 and further communicates with the second meter-in valve receiving bore 21, second meter-out valve receiving bore 22 and the second pump port passage 12 through a first oil hole 32, a second oil hole 33 and a third oil hole 34. A second pilot valve 35 is inserted into the second pilot valve receiving bore 27 of the valve housing 10.

Figure 1B:
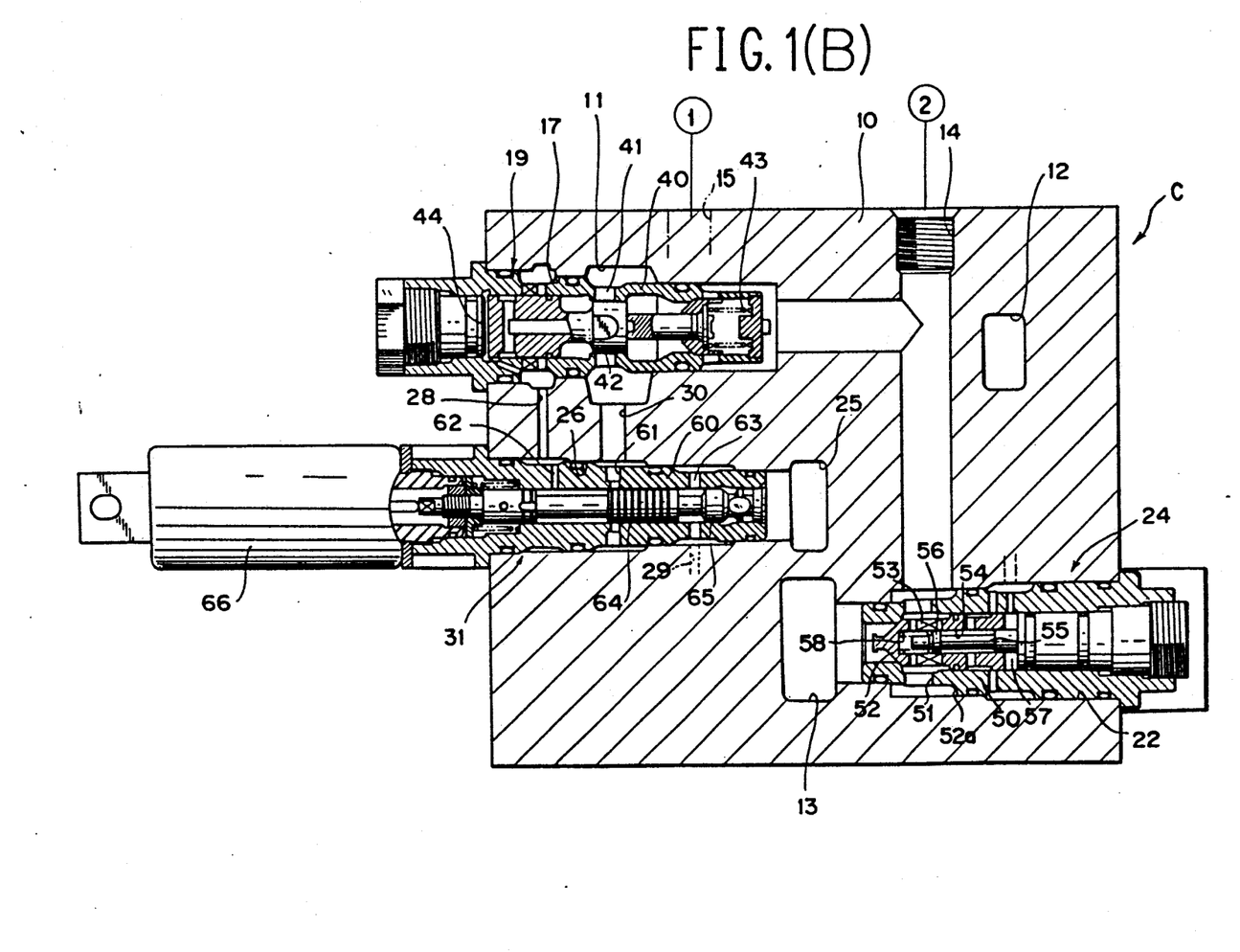
Figure 7:
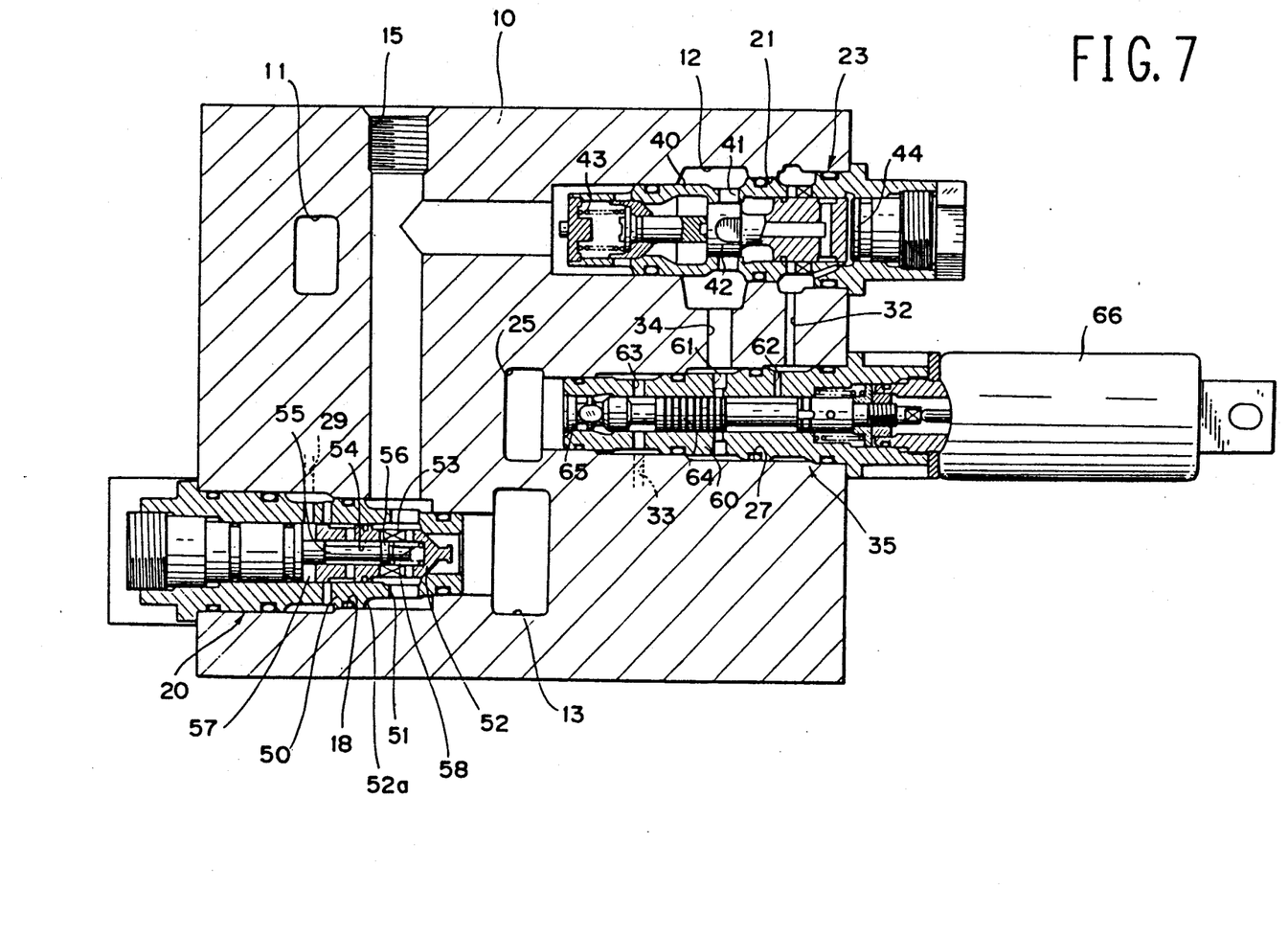
FIG. 7 is a cross-sectional views of the valve housing of the directional control valve assembly of the apparatus of the present invention illustrated in FIG. 2.

As shown in FIGS. 1(b) and 7, each of the first meter-in valve 19 and the second meter-in valve 21 is so constructed that: an inlet port 41 is formed in a sleeve-like element 40; a spool 42 is inserted into the sleeve-like element 40 to selectively shut off and open the inlet port 41, the spool being so positioned as to normally shut off the inlet port 41 under the influence of a resilient force exerted by a spring 43 and as to open the inlet port 41 when subject to a predetermined pilot pressure developed in a pressure chamber 44.

As shown in FIG. 7, each of the first meter-out valve 20 and the second meter-out valve 24 is so constructed that: an inlet port 51 is formed in a sleeve-like element 50; a poppet 52 for selectively shut off the inlet port 51 from the tank port passage 13 is inserted into the sleeve-like element 50; the inlet port 51 communicates with a back-pressure chamber 57 through a variable aperture 56 which is constructed of a slit groove 53 and a spool 55 having been inserted into an axial bore 54 of the sleeve-like element 50, to develop a pressure difference across the variable aperture 56; and a spring 58 is interposed between the spool 55 and a bottom portion of the axial bore 54 to normally bring the poppet 52 to its shut-off condition.

As shown in FIGS. 1(b) and 7, on each of sleeve-like elements 60 of the first pilot valve 31 and the second valve 35 are formed; an inlet port 61, an outlet port 62 and a dran port 63. A pool 64 for selectively shutting off the inlet port 61 from the outlet port 62 is integrally formed with a poppet 65 for selectively shutting off the drain port 63 from the pilot tank port passage 25, while inserted into the sleeve-like element 60. Each of the spool 64 and the poppet 65 is operated by means of a solenoid 66. The inlet port 61 communicates with the first pump port passage 11 and the second pump port passage 12 through the third oil hole 30 and 34, respectively. On the other hand, the outlet port 62 communicates with the pressure chamber 44 of each of the first meter-in valve 19 and the second meter-in valve 21 through the first oil holes 28 and 32, while the drain port 63 communicates with the back-pressure chamber 57 of each of the first meter-out valve 20 and the second meter-out valve 24 through the second oil holes 29 and 33.

As shown in FIG. 1(a), the lock valve assembly "B" is provided with a valve housing 70 fixedly mounted on the cylinder tube 6 of the hydraulic cylinder "A". In the valve housing 70 of the valve assembly "B" are formed a first valve bore 71, a second valve bore 72, a third valve bore 73 and a tank port 74. The first valve bore 71 communicates with the lifting-movement pressure chamber 9a of the hydraulic cylinder "A" through a first main port 75, and with the pressure oil passage "a" through a second main port 76. A check valve 77 is provided in the first valve bore 71 to prevent the pressure oil having entered the first main port 75 from flowing to the second main port 76. The second valve bore 72 communicates with the first valve bore 71. A poppet valve 78 is provided in the second valve bore 72 to control flow of the pressure oil between the first main port 75 and the tank port 74. A pilot valve 79 is provided in the third valve bore 73.

The poppet valve 78 has the following construction in which:

the second valve bore 72 is provided with: a first port 23' communicating with the first port 75; a second port 25' communicating with the tank port 74; a third port 27' which communicates with the tank port 74 through the pilot valve 79; and a fourth port 28' communicating with the tank port 74. A sleeve-like element 29' is mounted in the second valve bore 78. In the sleeve-like element 29' are formed: an inlet port 30' communicating with the first port 23'; and an outlet port 31' communicating with the second port 25'. A poppet 32' is slidably mounted in the sleeve-like element 29' to stop or start flow of the pressure oil between the inlet port 30' and the outlet port 31' of the sleeve-like element 29'. The poppet 32' is provided with an axial bore 33' in which a spool 34' is slidably mounted to define an annular chamber 35' in the axial bore 33'. The spool 34' abuts on a front surface 37' of an axial element 37' under the influence of a resilient force exerted by a compression coil spring 36' to define a poppet back pressure chamber 38', the axial element 37' being fixedly mounted in the sleeve-like element 29'. The annular chamber 35' communicates with the inlet port 30' through a variable throttle area 44' which is composed of: a slit-like inflow port 39' formed in a peripheral wall of the poppet 32'; and a first land portion 34(a) of the spool 34'. Further, the annular chamber 35' also communicates with the third port 27' through: a pressure oil hole 40' formed in the poppet 32'; a small-diameter portion 41' of the poppet 32'; and a pressure oil hole 42' formed in the sleeve-like element 29'. On the other hand, the poppet back pressure chamber 38' communicates with the third port 27'.

The axial element 37' is provided with a blind bore 50' in which a spool valve 51' is slidably mounted. In the blind bore 50' of the axial element 37', the spool valve 51' is urged leftwardly by a compression coil spring 52' to have its seat surface 51' abut on a valve seat 37'a of the axial element 37' so that the spool valve 51 prevents a pressure oil inflow hole 53' with a pressure oil outflow hole 54'. As is clear from FIG. 1(a), the inflow hole 53' communicates with the poppet back pressure chamber 38'. On the other hand, the outflow hole 54' communicates with the fourth port 28' through a port 55' formed in a peripheral wall of the sleeve-like element 29'. An oil pressure chamber 56' is formed between the blind bore 50' of the poppet 32' and the spool valve 51', and communicates with: the first port 23' through a port 57' and a hole 58'; and an auxiliary pressure chamber 61' through oil hole 60' provided with a throttle hole 59' which is an axial center hole of the spool valve 51'. On the other hand, the auxiliary pressure chamber 61' is formed by a blind bore 62' of the spool valve 51' and a left-hand portion of a rod element 63' slidably mounted in the blind bore 62'. As shown in FIG. 1(a), the rod element 63' has its right-hand end portion held in a spring shoe 64' so that the spool valve 51' is urged leftwardly to its closed position by a resilient force F3 exerted by the compression coil spring 52'.

Namely, the spool valve 51' is subjected to a rightward force F1 based on an inlet oil pressure P1 which also acts on the pressure chamber 56'. In operation, since the rightward force F1 increases, the spring 52' is compressed. Consequently, the inlet oil pressure P1 is applied to the auxiliary pressure chamber 61' through the throttle hole 59' to produce a leftward force F2 acting on the spool valve 51', whereby a rightward force acting on the spool valve 51' is reduced.

Incidentally, an area of the pressure chamber 56', which area is subjected to pressure of the pressure oil, is slightly larger than that of the auxiliary pressure chamber 61'.

The apparatus of the present invention has the above construction. Consequently, when the inlet oil pressure P1 exceeds a predetermined valve, the intlet oil pressure P1 causes the spool valve 51' to move rightward against the spring 52' so that the seat surface 51'a of the spool valve 51' is separted from the valve seat 37'a, whereby the inflow hole 53' communicates with the outflow hole 54'.

As a result, the pressure oil confined within the poppet back pressure chamber 38' flows to the tank port 74 through the inflow hole 53', outflow hole 54', port 55' and the fourth port 28' to reduce the leftward force F2 acting on the poppet 32', so that the poppet 32' is moved rightward under the influence of the inlet side oil pressure P1 acting on a shoulder portion 32'a of the poppet 32', whereby the seat surface 32'c of the poppet 32' is separated from the valve seat 30'a to permit the inlet port 30' to communicate with the outlet port 31'. Consequently, it is possible for the poppet 32' to reduce excessive pressure of the pressure oil received in the inlet port 30', so that the poppet may serve as a safety valve.

On the other hand, as shown in FIG. 1(a), in the pilot valve 79 of the lock valve assembly "B", a sleeve-like element 80 is mounted in the third valve bore 73 of the valve housing 70. In the sleeve-like element 80 are formed: an inlet port 81 communicating with the third port 27'; and an outlet port 82 communicating with the tank port 74. A valve 83 is slidably mounted in the sleeve-like element 80 to stop and start flow of the pressure oil between the inlet port 81 and the outlet port 82. In the sleeve-like element 80, the valve 83 is urged rightward by a compression coil spring 84 to stop flow of the pressure oil between the inlet port 81 and the outlet port 82. On the other hand, the valve 83 is moved leftward by energizing a solenoid 85 against the resilient force exerted by the spring 84 to permit the inlert port 81 to communicate with the outlet port 82. An opening area of each of the inlet port 81 and the outlet port 82 is controlled by controllig an amount of electric current supplied to the solenoid 85. Namely, a variable throttle area 86, which is composed of a valve surface 83a of the valve 83 and a seat surface 82a of the outlet port 82, is controlled by an external signal.

Now, operation of the apparatus of the present invention will be described.

As shown in FIG. 1(a), in the beginning of operation, the pressure oil confined within the liffing-movement pressure chamber 9a of the hydraulic cylinder "A"0 is prevented from flowing to the second main port 76 by means of the cheek valve 77. In addition, in the poppet valve 78, the inlet port 30' is prevented from communicating with the outlet port 31'. Therefore, under such circumstances, there is no fear that the pressure oil confined within the lifting-movement pressure chamber 9a of the cylinder "A" flow out thereof.

In case that the cylinder "A" of the working machine such as power shovels and the like must be expanded, the inlet port 61 is communicated with the outlet port 62 by displacing the spool 64 and the poppet 65 by means of a solenoid 66 of each of the first pilot valve 31 and the second pilot valve 35 and communicating the drain port 63 with the pilot tank port passage 25. As a result, the pressure oil discharged from the tank port passage 13 is supplied to the pressure chamber 44 of the first meter-in valve 19 or the second meter-in valve 21 to move the spool 42 to its communication position. At the same time, since the back-pressure chamber 57 of the first meter-out valve 20 of the second meter-out valve 24 communicates with the pilot tank port passage 25 to bring the poppet 52 to its communication position, the pressure oil discharged from fist pump port passage 11 or the second pump port passage 12 is supplied to the first port passage 14 or the second port passage 15 from which the pressure oil is futher supplied to the tank port passage 13.

Since the apparatus of the present invention has the above construction, it is possible to supply the pressure oil to the lifting-movement pressure chamber 9a of cylinder "A" through: the first port passage 14 of the directional control valve assembly "C"; pressure oil passage "a"; and the second main port 76, check valve 77 and the first main port 75 of the lock valve assembly "B". At this time, the pressure oil confined within the lowering-movement ptessure chamber 9b of the cylinder "A" flows to the tank port passage 13 of the directional control valve assembly "C" through; the pressure oil passage "b"; and the second port 15 of the directional control valve assembly "C", to permit the cylinder "A" to expand in lifting-movement operation of the working equipment such as shovels and the like.

In lowering-movement operatoin of the working equipment or in contracting operation of the cylinder "A", as shown in FIG. 7, both of the spool 64 and the poppet 65 are displaced by energizing the solenoid 66 of the second pilot valve 35 to permit: the inlet port 61 to communicate with the outlet port 62; and the drain port 63 to communicate with the pilot tank port 25. As a result, the pressure oil issued from the tank port 25 is supplied to the pressure chamber 44 of the second meter-in valve 21 to bring the spool 42 to its communication position. Consequently, it is possible to supply the pressure oil from the second pump port 12 to the second port 15, and further to the lowering-movement pressure chamber 9b to the cylinder "A" of the working machine such as power shovels and the like through the pressure oil passage "b".

At the this time, the pressure oil confined within the lifting-movement pressure chamber of the cylinder "A" is prevented from flowing to the passage "a" by means of the chack valve 77. In addition, since flow between the inlet port 30' and the outlet port 31' of the poppet valve 78 is stopped under such circumstances, the pressure oil confined within the lifting-movement pressure chamber 9a of the cylinder "A" can not flow out of the chamber 9a.

Then, by energizing both of the solenoid 66 of the second pilot valve 35 and the solenoid 85 of the pilot valve 79, the inlet port 81 of the pilot valve 79 is communicated with the outlet port 82 of the same.

As a result, the pressure oil confined within the lifting-movement pressure chamber 9a of the cylinder "A" flows to the third port 27' through: the first port 23'; inlet port 30'; variable throttle area 44'; annular chamber 35'; pressure oil hole 40'; small-diameter portion 41'; and he pressure oil hole 42', and further flows to the tank port 74 through the variable throttle area 86. Consequently, a pressure difference of the pressure oil· is produced in the variable throttle area 44' of the poppet valve 78 so that: the inlet side pressure $P_1$ of the variable throttle area 44' acts on the shoulder portion 32' a of the poppet 32' of the poppet valve 78; and the outlet side pressure $P_0$ of the variable throttle area 44' acts on the poppet back pressure chamber 38' through the throttle area 43' of the sleeve-like element 29' of the poppet valve 78.

In the above construction of the apparatus of the present invention, an amount of th pressure difference produced in the variable throttle area 44' is determined by a flow rate of the pressure oil flowing through the variable throttle area 44', and such flow rate of the pressure oil is determined by an opening area of the variable throttle area 86 of the pilot valve 79. In short, the amount of the pressure difference is determined by the opening area of the variable throttle area 86 of the pilot valve 79.

With respect to the poppet 32', the shoulder portion 32'a of the poppet 32' is subjected to the inlet side pressure $P_1$ so that the force $F_1$ acts on the shoulder portion 32'a of the popet 32 rightward. On the other hand, the poppet back pressure chamber 38' is subjected tot he outlet side pressure $P_0$ so that the force $F_2$ acts on a right-hand axial end surface of the poppet 32'. As a result, the poppet 32' is displaced rightward or leftward by a force resulted from: a difference in pressure area between the shoulder portion 32'a of the poppet 32' and the right-hand axial end surface of the poppet 32'; and a difference between the inlet side pressure $P_1$ and the outlet side pressure $P_0$.

In case that an opening amount of the variable throttle area 86 of the pilot valve 79 is reduced by keeping a small amount of electric current supplied to the solenoid 85 of rh pilot valve 79, the difference between the pressures $P_1$ and $P_0$ decreases to cause the leftward force $F_2$ to be larger than the rightward force $F_1$ so that the poppet 32' is urged leftward to have its valve surface 32c abutted on the valve seat 30'a formed in the sleeve-like element 29', whereby flow of the pressure oil between the inlet port 30' and the outlet port 31' is stopped.

As described above, when the poppet 32' is kept stationary, the pressure oil does not enter the poppet back pressure chamber 38' so that the throttle area 43' does not produce any pressure difference of the pressure oil in the hydraulic circuit of the apparatus of the present invention.

On the other hand, in case that an opening amount of the variable throttle area 86 of the pilot valve 79 is increased by keeping a large amount of electric current supplied to the solenoid 85 of the pilot valve 79, flow rate of the pressure oil passing through the variable throttle area 44' increases to produce a large pressure difference in the variable throttle area 44' so that the force $F_1$ acting on the poppet 32' rightward becomes larger than the force $F_2$ acting on the poppet 32' leftward to displace the poppet 32' rightward, whereby the valve surface 32'c of the poppet 32' is separated from the valve seat 30'a formed in the sleeve-like element 29' to start flow of the pressure oil between the inlet port 30' and the outlet port 30'. When the poppet 32' is displaced rightward, an opening amount of the variable throttle area 44' of the poppet valve 78 increases to reduce the pressure difference of the pressure oil therein. As a result, the poppet 32' of the poppet valve 78 is shifted to a position corresponding to an opening amount of the variable throttle area 86 of the pilot valve 79.

At this time, since the pressure oil confined within the poppet back pressure chamber 38' flows to the tank port 74 through the throttle area 43' of the sleeve-like element 29' of the poppet valve 78, flow rate of such pressure oil is restricted by the throttle area 43', to make it possible to prevent the poppet 32' from being suddenly shifted rightward.

As described above, by energizing the solenoid 85 of the pilot valve 79, it is possible to shift the poppet 32' of the poppet valve 78 rightward, so that the inlet port 30' is communicated with the outlet port 31' to permit the pressure oil confined within the lifting-movement pressure chamber 9a of the cylinder "A" to flow to a tank of the pressure oil of the apparatus of the present invention through the tank port 74, whereby the cylinder "A" is contracted to move down or lower the working equipment such as shovels of the power shovels. In addition, at this time, flow rate of the pressure oil flowing to the tank is controlled by controlling an opening amount of the variable throttle area 86 of the pilot valve 79, which opening amount is controlled by controlling an amount of electric current supplied to the solenoid 85 of the pilot valve 79. Therefore, in the apparatus of the present invention, in addition to its normal working operation, in case that the pressure oil passages of the apparatus are damaged in operation, it is possible to keep the lowering speed of the working equipment such as shoves and like constant.

We claim:

1. An apparatus for supplying a pressure oil to a hydraulic sylinder of a working machine provided with a working equipment, comprising:

a directional control valve assembly capable of being moved between a first position in which the pressure oil is supplied to a first port formed in one side of a valve housing, and a second port formed in another side of said valve housing communicates with a fisrst tank port; and a second position in which the pressure oil is supplied to said second port, and the pressure oil to said first port is fully cut off; and a lock valve assembly comprising a check valve for preventing the pressure oil from flowing out of a first main port to a second main port, said first main port being formed in a portion of a second valve housing mounted on a cylinder tube of said hydraulic cylinder so as to communicate with a lifting-movement pressure chamber of said hyraulic cylinder, and said second main port being formed in a second portion of said second valve housing; a poppet valve porvided in a valve bore formed in a position between a first main port and a second tank port formed in a third portion of said second valve housing, said poppet valve being porvided with a poppet which selectively prevents said first main port from communicating with said second tank port, and permits said first main port to communicate with said second tank port when a differential pressure of the pressure oil is developed between a front side and rear side of a throttle area of said poppet valve; and a pilot valve which is provided in said second valve housing to open and close its pressure oil passages so as to selectively permit the pressure oil to flow from a downstream side of said throttle area of said poppet valve to said second tank port through a variable throttle area of said pilot valve, which variable throttle area is controlled by an external signal;

wherein said first port of said directional control valve assembly is in communication with said lifting-movement pressure chamber of said hydraulic cylinder sequentially through a pressure oil passage, said second main port of said lock valve assembly and said first main port of said directional control valve assembly; said second port of said directional control valve assembly is in communication with a lowering-movement pressure chamber of said hydraulic cylinder through a pressure oil passage.

* * * * *